United States Patent [19]

Masumoto et al.

[11] 4,327,492

[45] May 4, 1982

[54] LASER OSCILLATOR EMPLOYING A NEODYMIUM-DOPED YTTRIUM ALUMINATE LASER ROD HAVING AN IRON-DOPED LAYER

[75] Inventors: Toshiaki Masumoto; Yasuhiko Kuwano, both of Tokyo, Japan

[73] Assignee: Nippon Electric Co., Ltd., Tokyo, Japan

[21] Appl. No.: 136,916

[22] Filed: Apr. 3, 1980

[30] Foreign Application Priority Data

Apr. 6, 1979 [JP] Japan .................................. 54/41778
Apr. 27, 1979 [JP] Japan .................................. 54/52680

[51] Int. Cl.³ .............................................. H01S 3/16
[52] U.S. Cl. ......................................... 372/41; 372/33
[58] Field of Search .................... 331/94.5 F; 330/4.3

[56] References Cited

U.S. PATENT DOCUMENTS 3,219,585 11/1965 Kaiser ........................... 331/94.5 F
3,614,662 10/1971 Monchamp et al. ........... 331/94.5 F
3,719,901 3/1973 Monchamp et al. ........... 331/94.5 F Primary Examiner—William L. Sikes
Attorney, Agent, or Firm—Laff, Whitesel, Conte & Saret

[57] ABSTRACT

Iron is close to a major surface layer of a yttrium aluminate laser rod so that the layer portion may have a filtering effect. The absorption factor for the short wavelength light of this layer portion depends upon the concentration c (weight percent) of the contained iron and the thickness t ($\mu$m) of the iron-containing layer. Consequently, the effect of the iron in the laser rod can be evaluated as a function of the product $c \times t$ (wt%·$\mu$m) of the concentration c and the thickness t. In the range of the product $c \times t$ of $1 < c \cdot t < 2 \times 10^2$, a laser output could be obtained which is higher than that of the conventional laser rod not containing iron jointly with a short wavelength light filter. The thickness of the iron-containing layer is ¼ or less of the radius of the laser rod.

14 Claims, 8 Drawing Figures

LASER OSCILLATOR EMPLOYING A NEODYMIUM-DOPED YTTRIUM ALUMINATE LASER ROD HAVING AN IRON-DOPED LAYER

BACKGROUND OF THE INVENTION

1. Field of the Art

The present invention relates to a laser oscillator employing a laser rod made of an yttrium aluminate crystal doped with neodymium ions, as active ions (Nd: $YAlO_3$), and to a process for manufacturing the same.

2. Description of the Prior Art

A single Nd: $YAlO_3$ crystal for laser use belongs to the orthorhombic system which can provide a linearly polarized laser output, without making use of a polarizer element. In addition, as compared to a crystal of yttrium aluminum garnet containing neodymium ions as active ions (Nd: $Y_3Al_5O_{12}$), neodymium ions are easily doped into the $YAlO_3$ single crystal. Hence, a laser rod containing a high concentration of active ions can be obtained.

However, a yttrium aluminate single crystal is liable to be adversely affected by ultra-violet rays and visible rays having wavelengths of 5000 Å or less. For instance, if a xenon flash lamp is used as a pumping light source, the laser oscillation efficiency is greatly reduced by the pumping light having wavelengths of 5000 Å or less (hereinafter this light is called "short wavelength light") among the light emitted from the xenon flash lamp. Therefore, in the prior art, measures where taken to provide a filter for cutting out the short wavelength light. The filter was inserted between a laser rod and a pumping light source lamp enclosed within a pumping cavity.

A solid state laser oscillator employing such a filter is disclosed in U.S. Pat. No. 4,039,970. This laser oscillator is constructed in such manner that the interior of the pumping cavity is partitioned into two space regions by means of a colored glass filter, which cuts out the short wavelength light. A laser rod and a pumping light source lamp are disposed in parallel to each other in their respective space regions. At the opposite ends of the laser rod there are reflecting mirrors which form a light resonator. Such a laser oscillator employing a filter has a disadvantage. The structure within the pumping cavity becomes to complex for inserting a colored glass filter. Also the light condensing efficiency for the pumping light is reduced by the surface reflection of the colored glass filter.

SUMMARY OF THE INVENTION

It is an object of the present invention to provide an yttrium aluminate laser having a high efficiency and a low oscillation threshold value, which laser is free from the efficiency reduction of laser oscillations stimulated by the short wavelength light.

Another object of the present invention is to provide an yttrium aluminate laser rod which can be used to construct a laser oscillator having a simple structure, without employing a filter within a pumping cavity for cutting out the short wavelength light emitted from a pumping light source lamp.

Still another object of the present invention is to provide a process for manufacturing an yttrium aluminate laser rod having a high efficiency which can prevent a deterioration of a laser oscillation efficiency responsive to short wavelength light.

The present invention is based upon a new finding that a yttrium aluminate single crystal, containing iron as an impurity, absorbs the short wavelength light which is harmful to laser oscillation. In other words, yttrium aluminate crystals, containing iron, present a filtering effect for absorbing short wavelength light and for transmitting long wavelength light.

However, an investigation of the effect upon the laser characteristics responsive to iron additives in the yttrium aluminate single crystal containing neodymium ions has proved that iron reduces the laser oscillation efficiency. For instance, a single yttrium aluminate crystal was grown for laser use by employing aluminum oxide and neodymium oxide of 99.999% purity and yttrium oxide of 99.9999% purity, as raw materials. The single crystal was grown while adding iron of 30 ppm. Then a laser rod of 5 mm in diameter of 50 mm in length was manufactured from the single crystal. Its pulse laser characteristics were compared with those of a laser rod not containing iron of the same dimensions. Consequently, it was proved that the laser rod not containing iron produced an output of about 7 mJ for an electrical input of 40 J, whereas the laser rod containing iron throughout the rod provided an output of about 1 mJ for the same input.

Iron greatly reduced the performance of the laser, because iron sensitively absorbs the short wavelength light and that absorption becomes a cause for the introduction of loss at the laser oscillation wavelength. Because of such a harmful effect, iron is normally avoided as an undesirable impurity.

On the other hand, iron has properties that absorb the short wavelength of light, as described above. Moreover, as the incident light is increased in strength, the absorption is correspondingly increased up to a certain extent. Hence it has been proved that an inclusion of iron is useful as a material for a filter.

The present invention has been worked out on the basis of the above-mentioned experimental results. In a solid state laser, only a central portion of a laser rod in the vicinity of its central axis contributes to laser oscillation. The peripheral portion of the laser rod close to its major surface plays substantially no part in the oscillation. Accordingly, by incorporating iron in only the peripheral portion of the yttrium aluminate laser rod, close to its surface in the form of an iron-doped layer, the harmful light having the short wavelength among the pumping lights is absorbed by the surface layer containing iron. The laser characteristics are maintained with no deterioration because the central portion of the laser rod, which contributes to the laser oscillation, does not contain iron.

The present invention is characterized in that iron is used in the layer portion, of a yttrium aluminate laser rod, which is close to its major surface so that the layer portion may have a filtering effect. The absorption factor for the short wavelength light of this layer portion is determined by the concentration c (weight percent) of the contained iron and the thickness t ($\mu m$) of the iron-containing layer. Consequently, the effect of the inclusion of iron in the laser rod can be more conveniently evaluated as a function of the product $c \times t$ (wt%. $\mu m$) of the concentration c and the thickness t than as a function of either the concentration c or the thickness t, taken singly.

According to our experiemental results, in the range of the product $c \times t$ of $1 < c \cdot t < 2 \times 10^2$, a laser output could be obtained which is higher than the output conventional laser rod not containing iron jointly with a short wavelength light filter. Especially if the product $c \times t$ of the iron-containing layer is in the range of $3 < c \cdot t < 80$, the laser output is higher than that of the conventional laser rod not containing iron. This increased output occurs regardless of the magnitude of the pumping energy. Thus the effect of the inclusion of iron is remarkable. It has been also observed that the thickness of the iron-containing layer should be ¼ or less of the radius of the laser rod. If it is thicker than this maximum value, the laser oscillation deteriorates.

The inventive laser rod having an iron-containing layer can be manufactured through the use of various processes such as, for example, a process for growing an iron-containing layer around a yttrium aluminate rod. Growth may be accomplished by the use of either a liquid-phase or gas-phase epitaxial process, a process of diffusing iron by heat-treatment after vapor-depositing iron around a rod, an iron-ion implantation process, a process of effecting heat-treatment with a laser rod embedded in iron oxide powder, or the like. However, the process relying upon solid-phase diffusion which is performed in iron oxide powder, is a relatively simple process.

According to this solid phase diffusion process, a laser rod having a polished major surface embedded within ferric oxide powder. Then the rod is heated to 1200°~1500° C. for 2~50 hours within a nitrogen gas atmosphere or within an atmosphere of nitrogen gas containing 5% or less hydrogen in order to diffuse iron from the rod side surface into the rod. Thereafter, the opposite ends of the rod are polished to be in parallel to each other. An excellent yttrium aluminate laser rod can be manufactured in this manner.

DETAILED DESCRIPTION OF THE PREFERRED EMBODIMENTS

Figure 1:
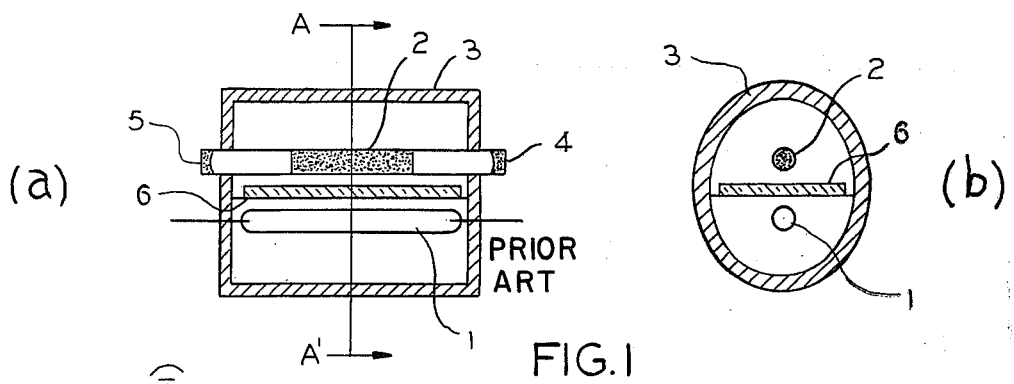
FIG. 1 has two cross-sectional views (taken perpendicular to each other) of a laser oscillator in the prior art.

Before entering into a description of the preferred embodiments of the present invention, a prior art laser oscillator disclosed in U.S. Pat. No. 4,039,970 will be briefly described for a contrast with the present invention. The prior art laser oscillator is shown in axial cross section in FIG. 1(a). A cross-sectional view (taken along line A—A' in FIG. 1(a)) is shown in FIG. 1(b). In this laser oscillator, the interior of a pumping cavity 3 is partitioned into two spatial regions by a colored glass filter 6 which intercepts the short wavelength light. A laser rod 2 and a pumping light source 1 of a xenon flash lamp are disposed in parallel with each other within the respective spatial regions with the colored glass filter 6 placed therebetween. Reflecting mirrors 4,5 are located at the opposite ends of the laser rod 2 for constructing a light resonator. Such a laser oscillator, employing a filter has a disadvantage since the structure within the pumping cavity becomes complexed and the light condensing efficiency for the pumping light is reduced.

The inventors of this invention conducted research for obviating such a disadvantage of the prior art device, and, as a result, they have mounted a filter on the laser rod itself. Hence, yttrium aluminate single crystals containing different impurities were grown. Their light absorption characteristics were investigated in detail. As a result, it was discovered that a yttrium aluminate single crystal containing iron absorbs a short wavelength light which is harmful to the laser oscillation.

Figure 2:
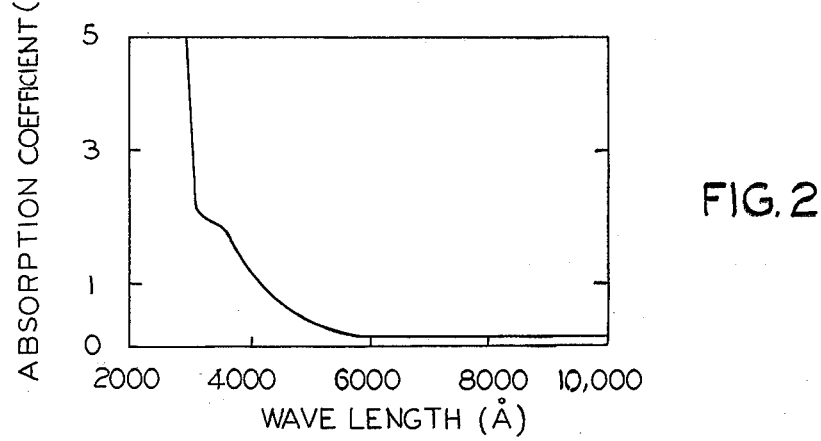
FIG. 2 is a graph which shows an absorption spectrum of a yttrium aluminate single crystal containing iron.

FIG. 2 is a graph which shows an absorption spectrum of a yttrium aluminate single crystal containing 0.005 wt% iron. The abscissa indicates wavelength in Angstrom units, and the ordinate indicates an absorption coefficient in terms of a value per centimeter. As will be seen from this figure, single yttrium aluminate crystal containing iron certainly has a strong absorption in the ultra-violet region. Accordingly, if a yttrium aluminate single crystal contains iron, it can serve as a filter for cutting off the ultra-violet region, by absorption.

Here, it is to be noted that, upon growing a single crystal of yttrium aluminate containing neodymium for laser use as described above, if the crystal is doped with iron, then even a very minute amount of an iron additive would cause very adverse effects upon the laser oscillation, and thus the laser output would become small. However, within the laser rod, the portion contributing to the laser osciallation is only the portion near the central axis of the rod. The peripheral area of the rod does not affect the oscillation at all. Hence, if a thin layer portion of a yttrium aluminate laser rod, along its surface, contains iron, then it is possible to make the thin layer portion achieve a filtering action for absorbing ultra-violet rays without interfering with the laser oscillation.

The present invention has been worked out on the basis of the above-described experimental results and the aforementioned consideration thereon. At first, the process for manufacturing a Nd: YAlO$_3$ laser according to the present invention will be explained in the sequence of the successive practical steps.

Upon practicing the present invention, a rod having the configuration which is to be eventually employed as a laser rod is first out from a Nd: YAlO$_3$ single crystal, which has been grown according to Czochralski method. If necessary, the surface of the rod is polished. However, a polishing of the opposite side surfaces into parallel planes is not required. Next, a container made of platinum and having a sufficient size for containing the aforementioned laser rod is prepared. Ferric oxide (Fe$_2$O$_3$) powder is packed in the container up to one-half of its volume while tapping the bottom of the container. Then the preliminarily prepared rod is placed thereon, the further powder is packed into the container to entirely embed the rod. This packed container is heated within an electric furnace to make iron diffuse into the rod.

Upon effecting the heat-treatment, the temperature, time and atmosphere must be appropriately determined. The optimum treatment conditions are different depending upon the status, i.e., grain size, shape, activity, etc. of the ferric oxide powder that is used. For instance, for red ferric oxide, desirably the heat-treatment is carried out at 1400° C. within a nitrogen atmosphere. In this instance, if it is carried out within an atmosphere mixed with oxygen, ferric oxide cannot be uniformly sintered and solidified. If it is carried out within an atmosphere mixed with hydrogen, the ferric oxide is reduced in a short time and thus diffusion cannot be well-effected. Also, the crystal surface becomes so rough that the rod cannot be used as a laser rod. On the other hand, if black-violet ferric oxide having a relatively large grain size is used therefor within an atmosphere of nitrogen containing oxygen or within a pure nitrogen atmosphere, the solidification of the powder does not proceed. Accordingly diffusion also does not proceed. In this case, it is most appropriate to carry out the heat-treatment at 1250° C. within an atmosphere of nitrogen containing 1% hydrogen. As will be appreciated from the above-described two examples, the optimum conditions are different depending upon the powder used.

However, it has been discovered from various experiments that whatever powder may be used, the heat-treatment must be carried out under the temperature in the range of $1200° \sim 1400°$ C. within an atmosphere of either nitrogen gas or nitrogen containing a small amount (about $0.1 \sim 5\%$) of hydrogen. In addition, under the above-mentioned conditions, a heat-treatment time of $2 \sim 50$ hours is appropriate. The depth of diffusion at that time is in a range of about several tens of microns to one hundred and several tens of microns. If the heat-treatment is carried out for too long a time, then compounds are formed on the crystal surface, and the surface becomes rough.

In order to find the appropriate condition, practically the following procedures could be taken. That is, at first only the prepared powder of ferric oxide is packed in the platinum container, and a trial treatment is carried out at 1400° C. for one hour within a certain atmosphese. If the powder is thereafter in such state that, while it is generally solidified, it can be easily crushed by means of tweezers, then both the temperature and the atmosphere gas are appropriate. If the solidified powder is extremely hard, then it is necessary to lower the temperature. If the surface of the solidified powder is reduced and presents metallic luster, then it is necessary to reduce the hydrogen content in the atmosphere. On the contrary, if the solidification has not proceeded very for then it is only necessary to increase the hydrogen content.

Upon determination of the heat-treatment conditions, it is sufficient to select the temperature from the values of 1200° C., 1300° C. and 1400° C. and to select the hydrogen content in nitrogen as the atmosphere gas from the values of 0%, 0.1%, 0.5% and 1.5%. The diffusion time is determined depending upon the depth of diffusion. On the other hand, a heat-treatment for a long time may sometimes bring about a deterioration of the crystallinity of the rod and hence it is undersirable. A treatment time within about 50 hours is appropriate. After the heat treatment conditions have been determined in the above-described manner and a layer containing iron has been formed along the surface of the Nd: $YAlO_3$ rod, the opposite end surfaces of the rod are ground, to remove the diffused layers, and polished into parallel mirror planes. Then the desired laser rod can be obtained.

Figure 3:
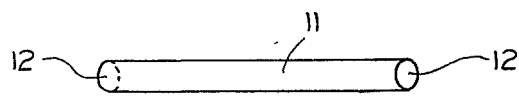
FIG. 3 is a schematic perspective view showing a configuration of a laser rod of yttrium aluminate containing neodymium ions as active ions (Nd: YAlO$_3$).

Now, a description will be made in greater detail with respect to the successive steps of the manufacturing process. At first, a Nd: $YAlO_3$ crystal is grown through use of the commonly practiced radio-frequency heated Czochralski method. As raw material 105.3 g of $Al_2O_3$ powder, 299.9 g of $Y_2O_3$ powder and 4.8 g of $Nd_2O_3$ powder each having a purity of 99.99% are weighed and mixed together. Then, the mixture is made molten by radio-frequency heating within a crucible made of iridium and having a diameter of 50 mm and a depth of 50 mm. Crystal growth is effected at a pulling rate of 1.8 mm/hour by making use of a seed crystal having an orientation of $<110>$. The rotation rate of the seed crystal is 15 revolutions per minutes. A nitrogen gas atmosphere is used as the growing atmosphere. The size of the grown crystal is about 18 mm in diameter and 100 mm in length. Two laser rods, each shown in FIG. 3, are cut from this grown crystal to form a rod of 3 mm in diameter and 30 mm in length. The side surface of the rod is polished by means of 1000 mesh abrasive powder. In the case of the above-described embodiment, the average Nd concentration within the rod was about 1.0 at %.

Subsequently, a black-violet colored ferric oxide powder having a purity of 99.9% is packed in a container made of platinum and having a length of 18 mm, a width of 45 mm and a depth of 17.5 mm. One of the two cut-out Nd: $YAlO_3$ rods is embedded in the center of the packed powder. A heat-treatment is carried out at 1200° C. for 3.5 hours, within an electric furnace. The speed of the temperature rising and falling is selected at about 450° C./hour. Nitrogen containing 5% hydrogen is used as the atmosphere gas. After the heat-treatment, the surface portion of the treated rod is colored a light yellow-green that is similar to the color of the iron containing Nd: $YAlO_3$ crystal which is grown within a reducing atmosphere. The iron content in the diffused layer is about 0.09 wt% in average concentrations, and the depth of diffusion is about 50 microns. Thereafter, the opposite end surfaces of each one of these two laser rods are polished into parallel mirror planes having a degree of parallelism within 5 seconds.

Figure 4:
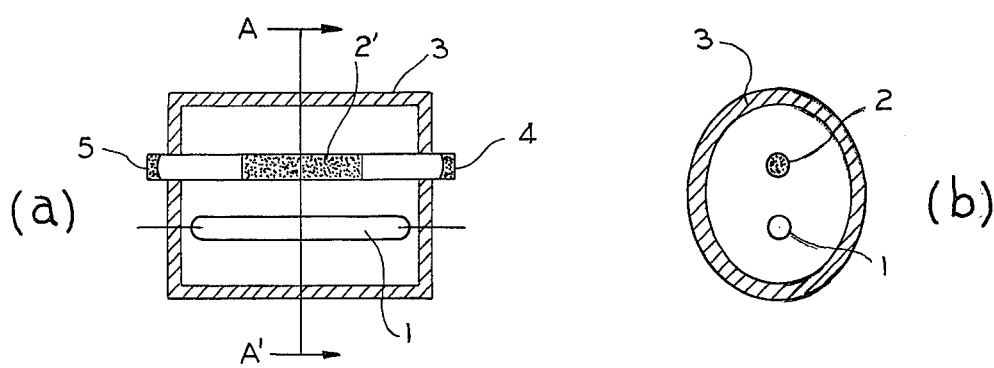
FIG. 4 has two cross-sectional views (taken perpendicular to each other) to show a laser oscillator according to an embodiment of this invention.

Among the thus manufactured two laser rods, one having no iron diffused therein was used as laser rod 2 in the laser oscillator shown in FIG. 1. A colored glass filter which intercepts light having a wavelength of 5000 Å or less (Colored glass filter Type V-Y50 manufactured by Tokyo Shibaura Electric Co., Ltd.) was used as the filter 6. Then, the performance of the laser was measured. The other laser rod 2', according to the present invention, in which iron had been diffused was used in a laser oscillator shown in FIG. 4. This oscillator has the same structure as the prior art oscillator of FIG. 1 except that the filter glass 6 is removed, and the performance of the laser was measured. The similar parts in FIG. 4 are identified by the same reference numerals as those used in FIG. 1. A description of the measuring conditions will be made in the following.

As the pumping light source lamp 1 a xenon flash lamp was used. An elliptic cylinder was used as a pumping cavity 3. On the focal lines of the elliptic cylinder are positioned the pumping light source lamp 1 and the laser rod 2 and 2', respectively. The radii of curvature of spherical mirrors 4 and 5 which form a light resonator, are both equal to 3 m, their reflectivities being 0.999 and 0.90, respectively. They are opposed to each other, at a distance of 35 cm. A power source for supplying electric power to the pumping light source lamp 1 comprises a capacitor having a capacitance of 10 microfarads. The capacitor is discharged within a period of about 40 microseconds. The laser oscillation wavelength was 1.0795 microns, and the laser output was measured by means of a pulse output meter employing a thermo-couple, and a silicon diode.

Figure 5:
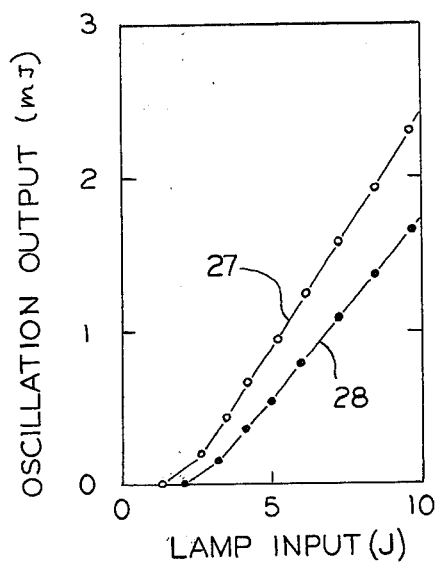
FIG. 5 is a diagram comparing the laser output characteristic of the Nd: YAlO$_3$ laser rod having an iron-containing layer according to the present invention and of the conventional laser rod with a colored glass filter both rods being excited by a xenon lamp flash.

The results of the measurements for the respective prior art laser performances when a laser rod did not contain iron and a laser rod according to the present invention, are shown in FIG. 5. In this figure, a curve 27 represents the laser output characteristics of the laser rod according to the present invention, while a curve 28 represents the laser output characteristics of the laser rod in the prior art. The abscissa represents an electric input to a xenon flash lamp in joules. The ordinate represents a laser output in milli-joule. The oscillation threshold energy of the laser rod according to the present invention is lower than that of the laser rod in the prior art, which is not subjected to a diffusion of iron, but which is used in combination with a colored glass filter. More particularly, the oscillation threshold energy of the laser rod in the prior art was 2.05 joules, whereas that of the laser rod according to the present invention was 1.35 joules.

With respect to the output, the laser rod according to the present invention was higher than that of the laser rod in the prior art. More particularly, when the electric imput to the xenon flash lamp was 9.80 joules, the output of the laser rod in the prior art to be used with a filter was 1.7 milli-joules, whereas the output of the laser rod according to the present invention was 2.3 milli-joules. Furthermore, the slope efficiency of the laser rod according to the present invention was about 1.3 times as high as that of the laser rod in the prior art. It is to be noted that the above-identified U.S. Pat. No. 4,039,970 discloses that a prior art laser rod not having diffused iron, used in combination with a colored glass filter, can obtain its highest laser output by intercepting a light having wavelengths of 5000 Å or less by the filter.

The present invention has been described above in connection to one preferred embodiment. Our further research on the effects of the formation condition of the iron-containing layer according to the present invention has proved that the interception of harmful light by the iron-containing layer depends upon the product of the concentration of iron within the layer multiplied the thickness of the layer.

Figure 6:
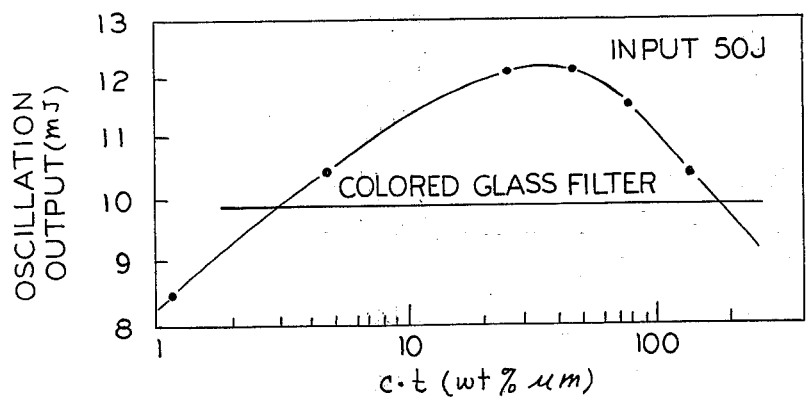
FIGS. 6 to 8 are diagrams for exemplifying the effects of the present invention, in which a pulse laser output value is represented for each of three different electrical inputs to a pumping light source lamp, as a function of a product of a thickness and an iron concentration of an iron-containing layer, as compared to the output of a conventional laser rod used jointly with a filter.
Figure 7:
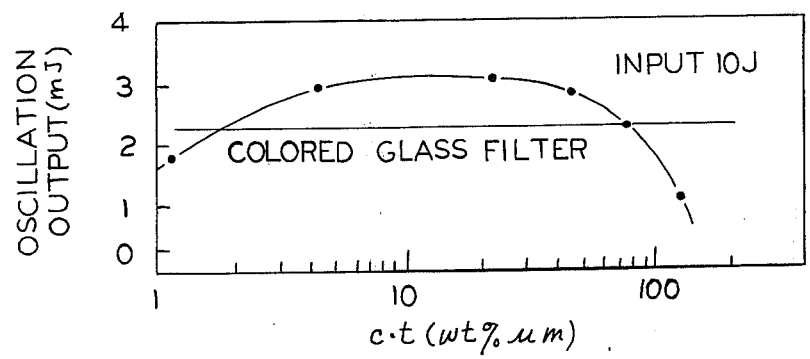
Figure 8:
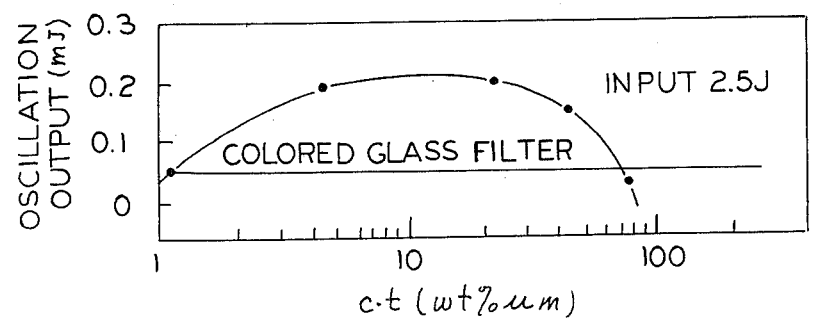

FIGS. 6 to 8 show one example of the dependency of a pulse output value upon an iron concentration C(wt%) and a thickness t ($\mu$m) of an iron-containing layer. The test laser rod was 3 mm in diameter and 30 mm in length, produced according to the present invention. The rod was used in the same laser oscillation device that is shown in FIG. 4 of the above-described embodiment.

In these FIGS. 6 to 8, the abscissa represents the product $c \times t$ (wt%.$\mu$m) and the ordinate represents the pulse laser output in milli-joules FIG. 6 shows the output when a lamp input of 50 joules is used which normally belongs to a strong light-pumping system. FIG. 7 shows the output when a lamp input of 10 joules is used, which is practically most commonly used light-pumping system FIG. 8 shows the output for a lamp input of 2.5 joules which is slightly higher than the threshold energy for laser oscillation. The pulse laser output is indicated as compared to the prior art laser oscillator shown in FIG. 1, that is, as compared to the system using a colored glass filter for intercepting a light having wavelengths of 5000 Å or less, used in combination with the conventional laser rod. As will be apparent from FIGS. 6 to 8, if the product $c \times t$ becomes small, a sufficient filtering effect cannot be obtained. Hence, the use of a colored glass filter becomes more advantageous.

The lamp input level determines lower limit of the range of the product $c \times t$, where the use of the laser rod according to the present invention is more advantageous than the use of the conventional laser rod in combination with the filter. That is, the output of the inventive laser is higher than that of the laser and filter for the product $c \times t$ of about 1 or larger, in the neighborhood of the oscillation threshold value (FIG. 8), for the product $c \times t$ of about 2 or larger in the proximity of the commonly used lamp input value of 10 joules (FIG. 7) and for the product $c \times t$ of about 3 or larger at the high pumping lamp input of 50 joules or higher. On the other hand, the filtering effect is enhanced as the product $c \times t$ is increased. At the same time, the light which is effective for the laser operation will be also partly intercepted. Consequently, as seen in the right hand portion of FIGS. 6 to 8, a laser output for the same lamp input is reduced as the product $c \times t$ is increased.

Near the upper limit of the range of the product $c \times t$, the use of the laser rod according to the present invention is more advantageous than the use of the conventional laser rod in combination with the filter. The product $c \times t$ is about 70 for the lamp input in. The neighborhood of the oscillation threshold value, the product $c \times t$ is about 80 for the lamp input level in the proximity of 10 joules. The product $c \times t$ is about 190 for the strong pumping at the input level of about 50 joules. It is to be noted that if the lamp imput value is higher than 50 joules, the laser output tends to saturate for the increase of the lamp input. Consequently, the dependency of the laser output upon the product $c \times t$, as well as the preference between the use of the laser rod according to the present invention, and the use of the conventional laser rod in combination with the filter were substantially equal to the relationship illustrated in FIG. 6. The above-described experimental results indicate the range of the product $c \times t$ where the use of the laser rod according to the present invention is more advantageous than the use of the conventional laser rod in combination with a colored glass filter for intercepting a harmful light in the prior art. This range can be defined as $1 < c \cdot t < 2 \times 10^2$ (Wt%.$\mu$m). It is to be noted that the range of the product $c \times t$ of $3 \leq c \cdot t < 80$ is an especially effective range. For the product $c \times t$, in this particular range, the use of the laser rod according to the present invention can provide a higher laser output than the use of the conventional laser rod in combination with a colored glass filter in the prior art, regardless of the pumping energy.

In addition, it is necessary to avoid expanding the iron-containing region up to the region which contributes to the laser oscillation, in the cross-section of the laser rod. Normally, it is necessary to limit the thickness t of the iron-doped layer to $\frac{1}{4}$ or less of the radius of the laser rod.

The effective range of the product c×t of the iron-containing layer, according to the present invention, has been discussed above as compared to the range for the conventional laser rod in combination with a colored glass filter. The laser rod according to the present invention could be practically used, even outside of the above-defined range of the product c×t, because the effect of the present invention does not require the filter used in the prior art. The construction of the laser oscillator becomes simple. Moreover, the laser rod according to the present invention may be used in combination with the colored glass filter. Then, a cooperative effect of these two items can be expected by appropriately selecting their absorption spectra and arrangement. Taking one example of the combined use of both items, the invention may use even a filter that could not be used effectively in the prior art because of its poor intercepting capability for a harmful light. This filter has become available in a very effective manner in the combined use with the laser rod, according to the present invention. For instance, a filter for intercepting light having wavelengths of 5000 Å or less was previously difficult to manufacture except for a limited size filter. However, when the filter is used in combination with the laser rod according to the present invention, even a filter having a slight intercepting capability in an ultraviolet region can be used effectively. Such a type of filters can be easily manufactured in any arbitrary shapes, even with the current technique. By means of a combination of such a type of filter and a laser rod according to the present invention, the laser characteristics under a highly pumped condition can be greatly improved. The proposed approach is not limited to a yttrium aluminate laser, but it will be widely applicable to other solid state lasers as an approach for improving a laser performance under a highly pumped condition, in the near future.

As described in detail above, according to the present invention, the necessity for providing a filter for intercepting a light having wavelengths of 5000 Å or less in the prior art is eliminated by forming an iron-containing layer around a yttrium aluminate laser rod containing neodymium ions, as an activator. Not only is the laser oscillator simple in structure, but also it is excellent in reliability. The manufacture of a laser oscilliator which has an excellent light condensing efficiency and which can provide a higher laser output than the prior art device, has become possible.

We claim:

1. A laser oscillator comprising a laser rod made of an yttrium aluminate crystal containing neodymium ions as active ions, an optical resonator disposed at the opposite ends of said laser rod, a pumping light source disposed adjacently to said laser rod, and cavity housing means for housing said laser rod and said pumping light source therein, the surface portion of said laser rod containing iron ions and the center portion of said laser rod being free of iron ions.

2. The laser oscillator claimed in claim 1, in which said surface portion containing iron ions has a thickness of ¼ or less of the radius of said rod, and the product of the surface portion thickness and the concentration of iron ions therein ranges from 1 to $2 \times 10^2$ wt%.μm.

3. The laser oscillator of claim 1 or claim 2 wherein said cavity housing means includes an elliptical cylinder which has an elongated cross section in one dimension and an elliptical cross section in another dimension lying perpendicular to said elongated cross section, said light source having an elongated shape parallel to said rod and aligned with said elongated dimension, and said rod and said light source lying on the foci of said elliptical cross section.

4. The laser oscillator of claim 3 wherein said rod is terminated on its opposite ends by polished spherical mirrors which form a light resonator.

5. The laser oscillator of claim 4 wherein said rod has a generally circular cross section and spherical mirrors have radii of curvature equal to approximately 100 times the diameter of said rod.

6. The laser oscillator of claim 5 wherein the length of said rod is approximately ten times the diameter of said rod.

7. A laser rod essentially comprising a neodymium-doped yttrium aluminate crystal, iron ions contained in a layer portion along the major surface of said laser rod, said layer having a thickness of ¼ or less of the radius of said laser rod.

8. A laser rod of claim 7, wherein the iron in said iron-containing layer portion is in the range of $1 < c \cdot t < 2 \times 10^2$ (wt%.μm), where the concentration of iron contained in said layer portion is represented by c (wt%) and the thickness of said iron-containing layer portion is represented by t (μm).

9. A laser rod of claim 7, wherein the iron in said iron-containing layer portion is in the range of $3 \leq c \cdot t \leq 80$ (wt%.μm), where the concentration of iron contained in said layer portion is represented by c (wt%) and the thickness of said iron-containing layer portion is represented by t (μm).

10. A process for manufacturing a laser rod, comprising the steps of cutting a rod from an yttrium aluminate single crystal, polishing a major surface of said rod, embedding said rod within ferric oxide powder, heating said rod while embedded in said ferric oxide at a temperature of 1200° to 1400° C. for a period in the range of 2 to 50 hours in a nitrogen atmosphere, and polishing the opposite end surfaces of said rod into parallel planes.

11. A proceses for manufacturing a laser rod, comprising the steps of cutting a rod from an yttrium aluminate single crystal, polishing a major surface of said rod, embedding said rod within ferric oxide powder, heating said rod while embedded in said ferric oxide at a temperature of 1200° to 1400° C. for a period in the range of 2 to 50 hours in an atmosphere of nitrogen containing 5% or less hydrogen, and polishing the opposite end surfaces of said rod into parallel planes.

12. A process for manufacturing a laser rod comprising the steps of:
   a. forming a single yttrium aluminate crystal into a laser rod having at least some polished surface;
   b. embedding said rod in a ferric oxide powder;
   c. heating said embedded rod to a temperature and in an atmosphere which solidifies the powder to a degree when it can be easily crushed by means of tweezers; and
   d. polishing opposite ends of said rod to a contour which forms a light resonator.

13. The process of claim 12 wherein the rod formed in step a. is approximately 3 mm in diameter and 30 mm in length.

14. The process of claim 13, wherein the contour of step d. is an arcuate section of a spherical mirror having a 3 m radius of curvature.

* * * * *

UNITED STATES PATENT AND TRADEMARK OFFICE
CERTIFICATE OF CORRECTION

PATENT NO. : 4,327,492

DATED : MAY 4, 1982

INVENTOR(S) : MASUMOTO, et al.

It is certified that error appears in the above—identified patent and that said Letters Patent is hereby corrected as shown below:

Col. 1, Line 31, "where" should be --were--.

Col. 3, Line 26, insert --is-- after "surface";

Col. 3, Line 52, insert a comma --,-- after "filter".

Col. 4, Line 29, insert --a-- after "figure,";

Col. 4, Line 30, insert a comma --,-- after "crystal";

Col. 4, Line 30, insert a comma --,-- after "iron";

Col. 4, Line 58, "out" should be --cut--;

Col. 4, Line 68, "the" first occurrence should be --and--.

Col. 5, Line 22, insert a comma --,-- after "Accordingly";

Col. 5, Line 56, "for" should be --far,--.

UNITED STATES PATENT AND TRADEMARK OFFICE
CERTIFICATE OF CORRECTION

PATENT NO. : 4,327,492
DATED : MAY 4, 1982
INVENTOR(S) : MASUMOTO, et al.

It is certified that error appears in the above—identified patent and that said Letters Patent is hereby corrected as shown below:

Col. 6, Line 11, "material" should be --materials--.

Col. 7, Line 2, insert a comma --,-- after "5";

Col. 7, Line 53, insert --by-- after "multiplied";

Col. 7, Line 65, insert a period --.-- after "joules";

Col. 7, Line 66, insert a comma --,-- after "used".

Col. 8, Line 2, insert a period --.-- after "system";

Col. 8, Line 37, change the comma "," to a period --.--;

Col. 8, Line 41, "imput" should be --input--;

Col. 8, Line 48, begin a new paragraph at "The".

Signed and Sealed this

Twenty-fourth Day of August 1982

[SEAL]

Attest:

GERALD J. MOSSINGHOFF

Attesting Officer    Commissioner of Patents and Trademarks